United States Patent [19]

Katayama et al.

[11] Patent Number: 5,795,931
[45] Date of Patent: Aug. 18, 1998

[54] INJECTION WELDING MATERIAL

[75] Inventors: Tsutomu Katayama; Seiichi Arakawa; Akio Miyamoto, all of Yamaguchi, Japan

[73] Assignee: UBE Industries, Ltd., Ube, Japan

[21] Appl. No.: 625,453

[22] Filed: Mar. 29, 1996

[30] Foreign Application Priority Data

| | | | |
|---|---|---|---|
| Mar. 31, 1995 | [JP] | Japan | 7-074851 |
| Aug. 25, 1995 | [JP] | Japan | 7-217758 |

[51] Int. Cl.⁶ ............................................. C08K 7/14
[52] U.S. Cl. ...................... 524/494; 156/321; 156/322; 264/331.19; 524/432; 524/451
[58] Field of Search .......................... 524/451, 606, 524/432; 264/331.19; 156/309.3, 308.2, 331.8, 321, 322; 525/432

[56] References Cited

U.S. PATENT DOCUMENTS

| | | | |
|---|---|---|---|
| 3,821,171 | 6/1974 | Beaton | 528/324 |
| 3,830,777 | 8/1974 | Burton | 524/606 |
| 3,843,591 | 10/1974 | Hedrick et al. | 524/606 |
| 3,846,367 | 11/1974 | Burton | 524/606 |
| 4,312,917 | 1/1982 | Hawley | 156/321 |
| 4,399,246 | 8/1983 | Hyde | 524/606 |
| 4,980,407 | 12/1990 | Okumoto et al. | |
| 5,026,763 | 6/1991 | Lohrbaecher et al. | 525/432 |
| 5,030,689 | 7/1991 | Plachetta et al. | 525/432 |
| 5,147,918 | 9/1992 | Price | 524/493 |
| 5,618,864 | 4/1997 | Court | 524/494 |

FOREIGN PATENT DOCUMENTS

| | | | |
|---|---|---|---|
| 646748 | 8/1962 | Canada | 525/432 |
| 34757 | 9/1981 | European Pat. Off. | 264/331.19 |
| 0 333 518 A2 | 9/1989 | European Pat. Off. | |
| 0 378 088 A3 | 7/1990 | European Pat. Off. | |
| 0 382 048 A2 | 8/1990 | European Pat. Off. | |
| 0 672 723 A1 | 9/1995 | European Pat. Off. | |
| 2046 832 | 3/1972 | Germany. | |
| 57-212252 A2 | 4/1981 | Japan. | |
| 57-212252 | 12/1982 | Japan | 525/432 |
| 62-62858 | 3/1987 | Japan | 525/432 |
| 63-289064 | 11/1988 | Japan | 525/432 |
| 63-295664 | 12/1988 | Japan | 525/432 |
| 63-304053 | 12/1988 | Japan | 525/432 |
| 3-200868 | 9/1991 | Japan | 264/331.19 |
| 4-101312 | 4/1992 | Japan. | |
| 1187136 | 4/1970 | United Kingdom | 156/321 |

OTHER PUBLICATIONS

Walter Michaeli *Plastics Processing*—pp. 178–194 (1995).

*Primary Examiner*—Veronica P. Hoke
*Attorney, Agent, or Firm*—Panitch Schwarze Jacobs & Nadel, P.C.

[57] ABSTRACT

An injection welding material comprising: (A) 40 to 95% by weight of a polyamide copolymer comprising 2 to 25% by weight of polyamide 6 component and 98 to 75% by weight of polyamide 66 component and (B) 5 to 60% by weight of an inorganic filler; and an injection welding material comprising: (A) 100 parts by weight of a polyamide resin mixture comprising: (A1) 90 to 70% by weight of a polyamide copolymer comprising 2 to 25% by weight of polyamide 6 component and 98 to 75% by weight of polyamide 66 component and (A2) 10 to 30% by weight of polyamide 12 resin and (B) 5 to 150 parts by weight of an inorganic filler.

14 Claims, 5 Drawing Sheets

INJECTION WELDING MATERIAL

FIELD OF THE INVENTION

The present invention relates to an injection welding material suitable for air intake manifolds and sensors of solenoid valves and anti-lock brakes, and it also relates to an injection welding material which, in addition to such suitableness, is also excellent in calcium chloride resistance.

In order to produce air intake manifolds, system piping and the like hollow parts solely by injection molding, the parts are produced by making two-piece moldings and then they are bonded to each other by using injection welding materials. The injection welding materials are also used when sensors for use in solenoid valves and anti-lock brakes are sealed, in order to protect electrical components and electronic parts contained therein from surroundings such as water, heat, various gases and the like.

BACKGROUND OF THE INVENTION

Polyamide resins are used in broad application fields as engineering plastics having excellent mechanical characteristics, heat resistance and chemical resistance. Since the strength of polyamide resins is further improved when inorganic fillers are blended, they are also used broadly in their reinforced form with inorganic fillers.

However, when polyamide 6 or polyamide 12 is used alone, it is excellent in welding property but cannot be used at high temperature because of its poor heat resistance. When polyamide 66 is used alone, it shows excellent heat resistance but has disadvantage in welding property. Particularly, its use in seal-molding causes poor adhesion, for example, between an inner coil bobbin and an outer resin of a sensor, thus posing a problem in that required insulation performance cannot be obtained.

In addition, when obtained parts are used as underhood parts of an automobile, they are attacked by calcium chloride, zinc chloride and the like metal halides used as antifreezing agents for road surface, so that cracks are formed within a short period of time and physical properties therefore cannot be maintained.

SUMMARY OF THE INVENTION

An object of the present invention is to provide an injection welding material having well-balanced injection welding property and heat resistance.

Another object of the present invention is to provide an injection welding material having well-balanced injection welding property, heat resistance, and calcium chloride resistance.

Other objects and effects of the present invention will be apparent from the following description.

The present invention relates to, as a first aspect, an injection welding material comprising:
(A1) 40 to 95% by weight, based on the total amount of the components (A1) and (B), of a polyamide copolymer comprising 2 to 25% by weight, based on the amount of the component (A1), of polyamide 6 component and 98 to 75% by weight, based on the amount of the component (A1), of polyamide 66 component, and
(B) 5 to 60% by weight, based on the total amount of the components (A1) and (B), of an inorganic filler.

The present invention also relates to, as a second aspect, an injection welding material comprising:
(A) 100 parts by weight of a polyamide resin mixture comprising:

(A1) 90 to 70% by weight, based on the total amount of the components (A1) and (A2), of a polyamide copolymer comprising 2 to 25% by weight, based on the amount of the component (A1), of polyamide 6 component and 98 to 75% by weight, based on the amount of the component (A1), of polyamide 66 component and (A2) 10 to 30% by weight, based on the total amount of the component (A1) and (A2), of polyamide 12 resin, and (B) 5 to 150 parts by weight of an inorganic filler.

DETAILED DESCRIPTION OF THE INVENTION

In the present invention, polyamide 6 means a polycapramide, polyamide 66 means a condensation polymer of hexamethylenediamine and adipic acid, and polyamide 12 means a polydocecaneamide.

The polyamide copolymer (A1) comprises 2 to 25% by weight, based on the amount of (A1), of polyamide 6 component and 98 to 75% by weight, based on the amount of (A1), of polyamide 66 component. The amount of the polyamide 6 component and that of the polyamide 66 component are preferably from 2 to 30% by weight and from 98 to 70% by weight, respectively, and more preferably from 7 to 18% by weight and from 93 to 82% by weight, respectively.

If the amount of the polyamide 6 component is less than 2% by weight, the welding property is deteriorated. If the amount of the polyamide 6 component exceeds 25% by weight, the heat stability is deteriorated.

The polyamide 12 resin (A2) which constitutes the polyamide resin mixture (A) of the second aspect of the present invention is used in an amount of from 10 to 30% by weight, preferably from 15 to 25% by weight, based on the amount of the polyamide resin mixture (A).

If the amount of the polyamide 12 resin is less than 10% by weight, improvement in calcium chloride resistance cannot be obtained. If it exceeds 30% by weight, the heat stability is reduced.

Examples of the inorganic filler (B) to be used in the present invention include powders such as of calcium carbonate, calcium silicate (wollastonite), talc, kaolin, mica, titanium oxide, alumina, silica, magnesium oxysulfonate whisker, ferrite, and the like; fibers such as glass fibers, carbon fibers, metal fibers, boron fibers, potassium titanate fibers, ceramic fibers and the like; and zeolite and xonotlite. Among these, calcium carbonate, calcium silicate (wollastonite), talc, kaolin, mica, titanium oxide, silica, magnesium oxysultonate whisker, glass fibers, boron fibers, potassium titanate fibers, ceramic fibers, zeolite, and xonotlite are preferred, and calcium silicate (wollastonite), silica, glass fibers, and potassium titanate fibers are particularly preferred.

The inorganic filler (B) preferably has a particle diameter or fiber diameter of from 0.1 to 30 μm, and more preferably is in the form of fiber. The surface of the inorganic filler (B) is preferably treated with a coupling agent to the matrix resin, such as an amino-silane coupling agent, an epoxy-silane coupling agent, and a titanium coupling agent. It is also preferred to use a greige agent, such as a urethane resin, an acrylic resin, a nylon resin and combinations thereof.

As the inorganic filler (B), it is particularly preferred to use those in the form of fibers having a fiber diameter of from 0.5 to 20 μm and treated with an amino-silane coupling agent, with the combination use of urethane or acrylic greige agents.

These inorganic fillers may be used alone or as a mixture of two or more.

In the first aspect of the present invention, the inorganic filler (B) is added within the range of from 5 to 60% by weight, preferably from 20 to 35% by weight, per 100% by weight in total of the polyamide copolymer (A1) and the inorganic filler (B). If its amount is less than 5% by weight, no improvement in mechanical strength can be obtained. If it exceeds 60% by weight, the surface property of a molded article is deteriorated.

The injection welding material of the first aspect of the present invention can be prepared easily by melt-kneading the polyamide copolymer (A1) and the inorganic filler (B).

In the second aspect of the present invention, the inorganic filler (B) is added within the range of from 5 to 150 parts by weight, preferably from 25 to 55 parts by weight, per 100 parts by weight of the polyamide resin mixture (A). If its amount is less than 5 parts by weight, no improvement in mechanical strength can be obtained. If it exceeds 150 parts by weight, the surface property of a molded article is deteriorated.

The injection welding material of the second aspect of the present invention can be prepared easily by melt-kneading the polyamide copolymer (A1), the polyamide 12 resin (A2), and the inorganic filler (B).

Depending on the required characteristics, the injection welding material of the present invention may contain other additives, such as a heat resisting agent, a weather resisting agent including an ultraviolet ray absorbent, a flame retarder, an antistatic agent, a lubricant, a plasticizer, a nucleating agent, a foaming agent, a coloring agent, a stabilizer, a coupling agent and the like.

Examples of the use of the injection welding material of the present invention are described, though the present invention is not construed as being limited thereto.

Figure 4:
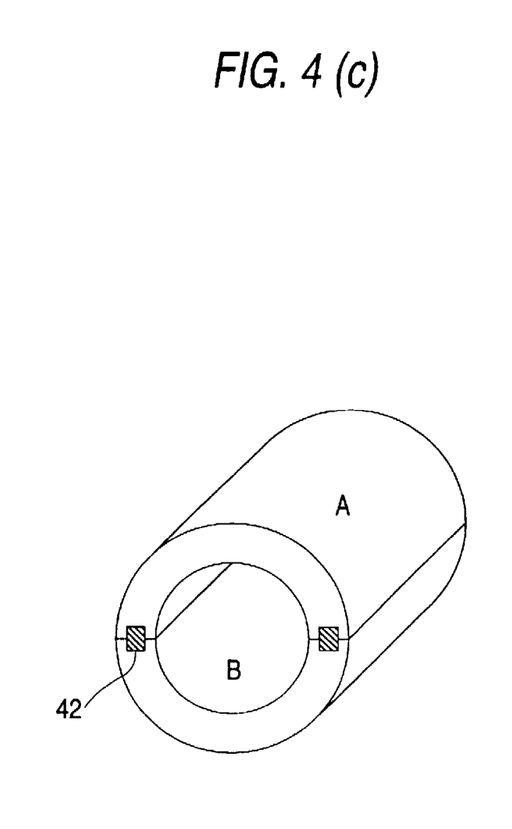
FIGS. 4(a) to 4(c) show an example of the use of the injection welding material of the present invention.

A process for the production of a hollow part is shown in FIG. 4. Firstly, members A and B which constitute the hollow part are separately molded (FIG. 4(a)), and then the members A and B are assembled to form the hollow part (FIG. 4(b)). The method for assembling is not particularly limited. The members may be once taken out from a mold and assembled with hands, and then the assembly is then placed again in the mold. Alternatively, the members may be automatically assembled in the mold. The hollow part is then obtained by packing a space 41 made of slots formed on the members A and B with a molten injection welding material 42 of the present invention (FIG. 4(c)). The shape of the space 41 is not limited. Materials to form the members A and B are not particularly limited, and resins, metals, alloys and the like can be used.

Figure 5:
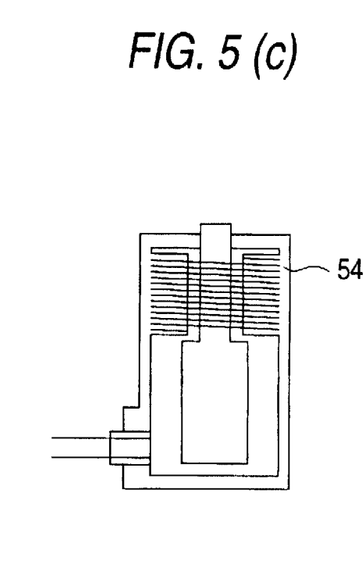
FIGS. 5(a) to 5(c) another example of the use of the injection welding material of the present invention.

A method for the production of a sensor for anti-lock brakes is shown in FIG. 5. A magnet 51 is inserted into a mold and molded with an injection welding material 52 of the present invention to prepare a bobbin (FIG. 5(a)). An electric wire 53 is wound on the bobbin to prepare a coil (FIG. 5(b)). The coil is inserted into a mold and molded with an injection welding material 54 of the present invention to prepare a sensor (FIG. 5(c)). By the use of the injection welding material of the present invention, welding failure at all the welded parts throughout FIG. 5(c) can be prevented so that a sensor having excellent water resistance and insulation performance can be obtained.

The present invention will be described in more detail below with reference to Examples and Comparative Examples, but the present invention is not construed as being limited thereto and can be applied to any parts produced by using an injection welding process.

In Examples and Comparative Examples, evaluation of the injection welding material was carried out by the following method.

Figure 1:
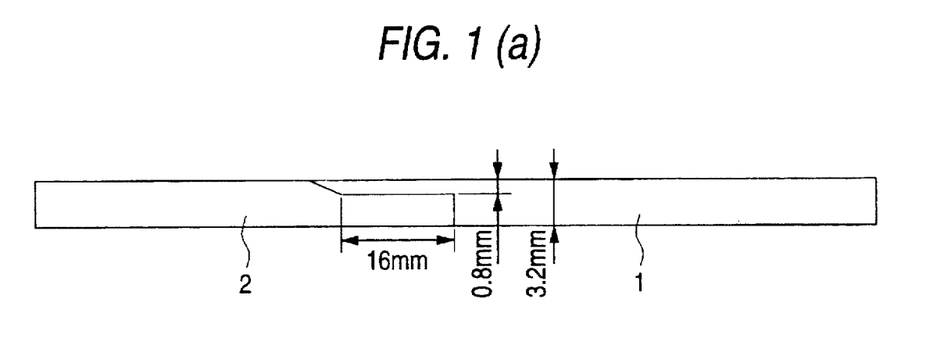
FIGS. 1(a) and 1(b) show the shape of a test piece for use in the evaluation of injection welding property.

As shown in FIG. 1, the test piece has a shape of the No. 1 piece of ASTM D 638. FIG. 1(a) is a side view of the test piece and FIG. 1(b) is an elevation view thereof. A single test piece is obtained by making the boundary interface of the components 1 and 2 fused by injection welding.

Figure 2:
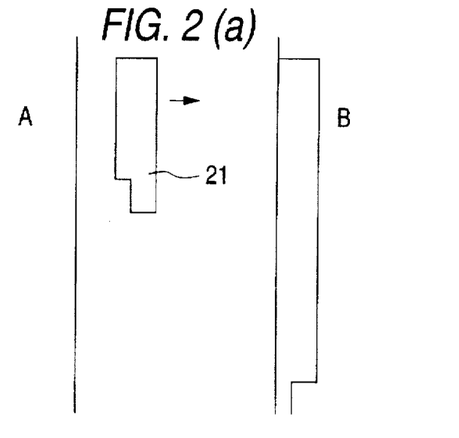
FIGS. 2(a) to 2(f) show a preparation sequence of a test piece for use in the evaluation of injection welding property.

The test piece was prepared in accordance with the preparation sequence of FIG. 2. A metal piece 21 having a shape of the component 2 of FIG. 1 was inserted into a mold for No. 1 piece of ASTM D 638 (FIG. 2(a)), and an injection welding material 22 was injected into the gap to effect molding of the component 1 (FIG. 2(b) and FIG. 2(c)). The thus-obtained component 1 was sufficiently cooled and then inserted into the mold (FIG. 2(d)), and an injection welding material 23 was injected into the gap to effect molding of the component 2 (FIG. 2(e)) to obtain a bonded test piece 24 (FIG. 2(f)). In FIG. 2, A and B respectively indicate a fixing part and a moving part of the mold.

Tensile strength of the test piece was evaluated as an injection welding strength in accordance with the procedure of ASTM D 638, by measuring its maximum tensile strength until it is peeled off from the boundary interface or broken at a position other than the boundary (i.e., the base material is broken).

The heat resistance of the injection welding material was evaluated by its deflection temperature under load measured in accordance with the procedure of ASTM D 648.

Figure 3:
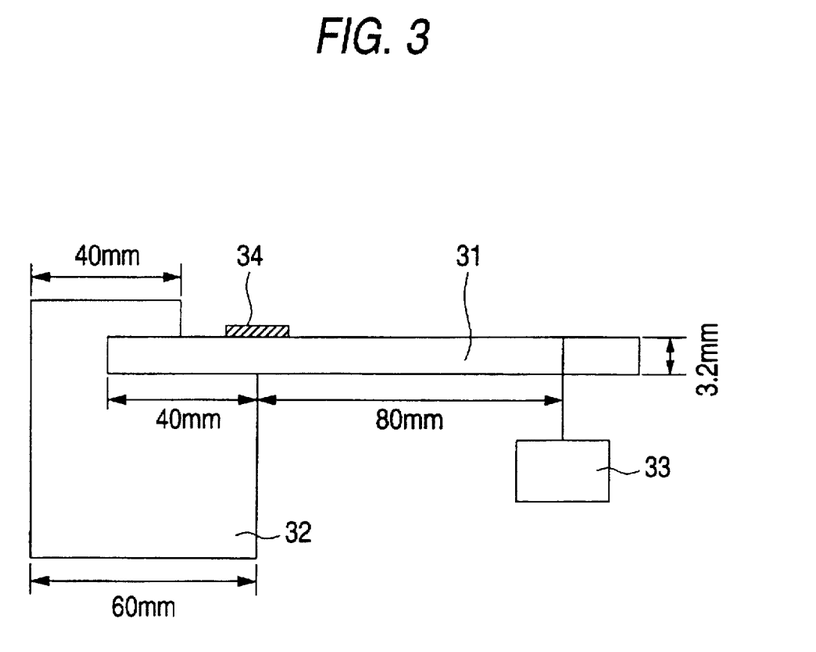
FIG. 3 shows a method for the measurement of calcium chloride resistance.

The calcium chloride resistance of the injection welding material was evaluated by an overhung bending method shown in FIG. 3. A test piece 31 (127×12.7×3.2 mm) was adjusted to the equilibrium moisture in the air (23° C., 65%RH). The test piece 31 was then attached to a jig 32, and a gauze 34 impregnated with a saturated calcium chloride aqueous solution was applied to the maximum stress portion of test piece 31 under three point stress conditions of 0, 75 and 110 kgf/cm² using a weight 33. Thereafter, the set of test piece and jig was allowed to stand for 1 hour in an oven of 100° C. After taking out from the oven, generation of cracks on the test piece surface was observed by the naked eye. The standing in oven and observation of cracks by the naked eye were repeated 10 cycles.

EXAMPLE 1

An injection welding material was obtained by melt-kneading 70% by weight of a polyamide 6/66 copolymer containing 2% by weight of the polyamide 6 component with 30% by weight of glass fiber. Results of the evaluation of this material are shown in Table 1.

EXAMPLE 2

An injection welding material was obtained by melt-kneading 70% by weight of a polyamide 6/66 copolymer containing 15% by weight of the polyamide 6 component with 30% by weight of glass fiber. Results of the evaluation of this material are shown in Table 1.

EXAMPLE 3

An injection welding material was obtained by melt-kneading 70% by weight of a polyamide 6/66 copolymer containing 25% by weight of the polyamide 6 component with 30% by weight of glass fiber. Results of the evaluation of this material are shown in Table 1.

COMPARATIVE EXAMPLE 5

An injection welding material was obtained by melt-kneading 70% by weight of polyamide 66 with 30% by weight of kaolin. Results of the evaluation of this material are shown in Table 1.

In Table 1, "EX" means Example and "CE" means Comparative Example.

TABLE 1

| | EX 1 | EX 2 | EX 3 | CE 1 | CE 2 | CE 3 | EX 4 | CE 4 | CE 5 |
|---|---|---|---|---|---|---|---|---|---|
| Composition | | | | | | | | | |
| Polyamide 6/66 (polyamide 6: 2%) | 70 | — | — | — | — | — | — | — | — |
| Polyamide 6/66 (polyamide 6: 15%) | — | 70 | — | — | — | — | 70 | — | — |
| Polyamide 6/66 (polyamide 6: 25%) | — | — | 70 | — | — | — | — | — | — |
| Polyamide 6 | — | — | — | 70 | — | — | — | 70 | — |
| Polyamide 66 | — | — | — | — | 70 | — | — | — | 70 |
| Polyamide 12 | — | — | — | — | — | 70 | — | — | — |
| Glass fiber | 30 | 30 | 30 | 30 | 30 | 30 | — | — | — |
| Kaolin | — | — | — | — | — | — | 30 | 30 | 30 |
| Weld peeling strength (kgf) | 90 | 217 | 220 | 200 | not welded | 180* | 238 | 223 | 32 |
| Deflection temperature under load (18.6 kgf/cm$^2$) (°C.) | 240 | 224 | 200 | 212 | 255 | 172 | 167 | 150 | 155 |

Note: *The base material was broken.

COMPARATIVE EXAMPLE 1

An injection welding material was obtained by melt-kneading 70% by weight of polyamide 6 with 30% by weight of glass fiber. Results of the evaluation of this material are shown in Table 1.

COMPARATIVE EXAMPLE 2

An injection welding material was obtained by melt-kneading 70% by weight of polyamide 66 with 30% by weight of glass fiber. Results of the evaluation of this material are shown in Table 1.

COMPARATIVE EXAMPLE 3

An injection welding material was obtained by melt-kneading 70% by weight of polyamide 12 with 30% by weight of glass fiber. Results of the evaluation of this material are shown in Table 1.

EXAMPLE 4

An injection welding material was obtained by melt-kneading 70% by weight of a polyamide 6/66 copolymer containing 15% by weight of the polyamide 6 component with 30% by weight of kaolin. Results of the evaluation of this material are shown in Table 1.

COMPARATIVE EXAMPLE 4

An injection welding material was obtained by melt-kneading 70% by weight of polyamide 6 with 30% by weight of kaolin. Results of the evaluation of this material are shown in Table 1.

EXAMPLE 5

An injection welding material was obtained by melt-kneading 80 parts by weight of a polyamide 6/66 copolymer containing 15% by weight of the polyamide 6 component with 20 parts by weight of polyamide 12 resin and 40 parts by weight of glass fiber. Results of the evaluation of this material are shown in Table 2.

EXAMPLE 6

An injection welding material was obtained by melt-kneading 80 parts by weight of a polyamide 6/66 copolymer containing 25% by weight of the polyamide 6 component with 20 parts by weight of polyamide 12 resin and 40 parts by weight of glass fiber. Results of the evaluation of this material are shown in Table 2.

COMPARATIVE EXAMPLE 6

An injection welding material was obtained by melt-kneading 100 parts by weight of polyamide 6 resin with 40 parts by weight of glass fiber. Results of the evaluation of this material are shown in Table 2.

COMPARATIVE EXAMPLE 7

An injection welding material was obtained by melt-kneading 100 parts by weight of polyamide 66 resin with 40 parts by weight of glass fiber. Results of the evaluation of this material are shown in Table 2.

EXAMPLE 7

An injection welding material was obtained by melt-kneading 90 parts by weight of a polyamide 6/66 copolymer containing 15% by weight of the polyamide 6 component with 10 parts by weight of polyamide 12 resin and 40 parts by weight of glass fiber. Results of the evaluation of this material are shown in Table 2.

EXAMPLE 8

An injection welding material was obtained by melt-kneading 70 parts by weight of a polyamide 6/66 copolymer containing 15% by weight of the polyamide 6 component with 30 parts by weight of polyamide 12 resin and 40 parts by weight of glass fiber. Results of the evaluation of this material are shown in Table 2.

EXAMPLE 9

An injection welding material was obtained by melt-kneading 95 parts by weight of a polyamide 6/66 copolymer containing 15% by weight of the polyamide 6 component with 5 parts by weight of polyamide 12 resin and 40 parts by weight of glass fiber. Results of the evaluation of this material are shown in Table 2. In Example 9, the calcium chloride resistance was somewhat inferior, but other properties were excellent.

EXAMPLE 10

An injection welding material was obtained by melt-kneading 60 parts by weight of a polyamide 6/66 copolymer containing 15% by weight of the polyamide 6 component with 40 parts by weight of polyamide 12 resin and 40 parts by weight of glass fiber. Results of the evaluation of this material are shown in Table 2. In Example 10, the thermal properties were somewhat inferior, but other properties were excellent.

EXAMPLE 11

An injection welding material was obtained by melt-kneading 80 parts by weight of a polyamide 6/66 copolymer containing 15% by weight of the polyamide 6 component with 20 parts by weight of polyamide 12 resin and 40 parts by weight of kaolin. Results of the evaluation of this material are shown in Table 2.

EXAMPLE 12

An injection welding material was obtained by melt-kneading 100 parts by weight of a polyamide 6/66 copolymer containing 15% by weight of the polyamide 6 component with 40 parts by weight of kaolin. Results of the evaluation of this material are shown in Table 2. In Example 12, the calcium chloride resistance was somewhat inferior, but other properties were excellent, and the weld strength was particularly excellent.

COMPARATIVE EXAMPLE 8

An injection welding material was obtained by melt-kneading 80 parts by weight of polyamide 66 resin with 20 parts by weight of polyamide 12 resin and 40 parts by weight of kaolin. Results of the evaluation of this material are shown in Table 2.

In Table 2, "EX" means Example and "ICE" means Comparative Example.

TABLE 2

| | EX 5 | EX 6 | CE 6 | CE 7 | EX 7 | EX 8 | EX 9 | EX 10 | EX 11 | EX 12 | CE 8 |
|---|---|---|---|---|---|---|---|---|---|---|---|
| Composition | | | | | | | | | | | |
| Polyamide 6/66 (polyamide 6: 15%) | 80 | — | — | — | 90 | 70 | 95 | 60 | 80 | 100 | — |
| Polyamide 6/66 (polyamide 6: 25%) | — | 80 | — | — | — | — | — | — | — | — | — |
| Polyamide 12 | 20 | 20 | — | — | 10 | 30 | 5 | 40 | 20 | — | 20 |
| Polyamide 6 | — | — | 100 | — | — | — | — | — | — | — | — |
| Polyamide 66 | — | — | — | 100 | — | — | — | — | — | — | — |
| Glass fiber | 40 | 40 | 40 | 40 | 40 | 40 | 40 | 40 | — | — | — |
| Kaolin | — | — | — | — | — | — | — | — | 40 | 40 | 40 |
| Weld peeling strength (kgf) | 164 | 178 | 180 | 70 | 185 | 142 | 202 | 137 | 151 | 238 | 102 |
| Deflection temperature under load (18.6 kgf/cm$^2$) (°C.) | 216 | 195 | 205 | 255 | 218 | 209 | 204 | 188 | 160 | 167 | 240 |
| Calcium chloride resistance (cycle) | >10 | >10 | 2 | 3 | >10 | >10 | 8 | >10 | >10 | 3 | >10 |

According to the first aspect of the present invention, an injection welding material which is suitable for injection welding and seal-molding can be obtained by adding an inorganic filler to a polyamide 6/66 copolymer comprising 2 to 25% by weight of polyamide 6 component and 98 to 75% by weight of polyamide 66 component.

According to the second aspect of the present invention, an injection welding material which is excellent in calcium chloride resistance and suitable for injection welding and seal-molding can be obtained by adding polyamide 12 resin and an inorganic filler to a polyamide 6/66 copolymer comprising 2 to 25% by weight of polyamide 6 component and 98 to 75% by weight of polyamide 66 component.

While the invention has been described in detail and with reference to specific examples thereof, it will be apparent to one skilled in the art that various changes and modifications can be made therein without departing from the spirit and scope thereof.

What is claimed is:

1. An injection welded article comprising;
   an injection welding material consisting essentially of:
   (A1) 40 to 95% by weight, based on the total amount of components (A1) and (B), of a polyamide copolymer comprising 2 to 25% by weight, based on the amount of component (A1), of polyamide 6 component and 98 to 75% by weight, based on the amount of component (A1), of polyamide 66 component, and
   (B) 5 to 60% by weight, based on the total amount of components (A1) and (B), of an inorganic filler, wherein said component (A1) and said component (B) are a heat-resistant injection welding material capable of attaching a first member to a second member by forming an injection weld between said first member and said second member and of heat sealing an article.

2. The article according to claim 1, wherein said article comprises a seal formed from said injection welding material.

3. The article according to claim 2, wherein said article is selected from the group consisting of sensors, and valves.

4. The article according to claim 1, wherein said article comprises a first member and a second member, said first member and second member being attached by said injection welding material.

5. (New) The article according to claim 4, wherein said article is selected from the group consisting of air intake manifolds, and system piping.

6. An injection welded article comprising:
an injection welding material consisting essentially of:
(A) 100 parts by weight of a polyamide mixture consisting essentially of:
 (A1) 90 to 70% by weight, based on the total amount of components (A1) and (A2), of a polyamide copolymer comprising 2 to 25% by weight, based on the amount of component (A1), of polyamide 6 component and 98 to 75% by weight, based on the amount of component (A1), of polyamide 66 component and
 (A2) 10 to 30% by weight, based on the total amount of components (A1) and (A2), of polyamide 12 resin, and
(B) 5 to 150 parts by weight of an inorganic filler, wherein said component (A1), said component (A2) and said component (B) are a heat-resistant and calcium chloride-resistant injection welding material capable of attaching a first member to a second member by forming an injection weld between said first member and said second member and of heat-sealing an article.

7. The article according to claim 6, wherein said article comprises a seal formed from said injection welding material.

8. The article according to claim 7 wherein said article is selected from the group consisting of sensors, and valves.

9. The article according to claim 6 wherein said article comprises a first member and a second member, said first member and second member being attached by said injection welding material.

10. The article according to claim 9 wherein said article is selected from the group consisting of air intake manifolds, and system piping.

11. An injection welding process for producing an injection welded article, comprising sealing said article with an injection welding material consisting essentially of
 (A1) 40 to 95% by weight, based on the total amount of components (A1) and (B), of a polyamide copolymer comprising 2 to 25% by weight, based on the amount of component (A1), of polyamide 6 component and 98 to 75% by weight, based on the amount of component (A1), of polyamide 66 component, and
 (B) 5 to 60% by weight, based on the total amount of components (A1) and (B), of an inorganic filler.

12. An injection welding process for producing an injection welded article having a first member and a second member, comprising assembling said first member and said second member with an injection welding material consisting essentially of
 (A1) 40 to 95% by weight, based on the total amount of components (A1) and (B), of a polyamide copolymer comprising 2 to 25% by weight, based on the amount of component (A1), of polyamide 6 component and 98 to 75% by weight, based on the amount of component (A1), of polyamide 66 component, and
 (B) 5 to 60% by weight, based on the total amount of components (A1) and (B), of an inorganic filler.

13. An injection welding process for producing an injection welded article, comprising sealing said article with an injection welding material consisting essentially of
(A) 100 parts by weight of a polyamide resin mixture consisting essentially of
 (A1) 90 to 70% by weight, based on the total amount of components (A1) and (A2), of a polyamide copolymer comprising 2 to 25% by weight, based on the amount of component (A1), of polyamide 6 component and 98 to 75% by weight, based on the amount of component (A1), of polyamide 66 component and
 (A2) 10 to 30% by weight, based on the total amount of components (A1) and (A2), of polyamide 12 resin, and
(B) 5 to 150 parts by weight of an inorganic filler.

14. An injection welding process for producing an injection welded article having a first member and a second member, comprising assembling said first member and said second member with an injection welding material consisting essentially of
(A) 100 parts by weight of a polyamide resin mixture consisting essentially of:
 (A1) 90 to 70% by weight, based on the total amount of components (A1) and (A2), of a polyamide copolymer comprising 2 to 25% by weight, basedcdon the amount of component (A1), of polyamide 6 component and 98 to 75% by weight, basedon the amount of component (A1), of polyamide 66 component and
 (A2) 10 to 30% by weight, based on the total amount of components (A1) and (A2), of polyamide 12 resin, and
(B) 5 to 150 parts by weight of an inorganic filler.

* * * * *